United States Patent [19]

Thomas

[11] Patent Number: 5,373,433
[45] Date of Patent: Dec. 13, 1994

[54] POWER INVERTER FOR GENERATING VOLTAGE REGULATED SINE WAVE REPLICA

[75] Inventor: Gregory H. Thomas, Bothell, Wash.

[73] Assignee: Trace Engineering, Arlington, Wash.

[21] Appl. No.: 878,639

[22] Filed: May 5, 1992

[51] Int. Cl.$^5$ .............................................. H02M 1/12
[52] U.S. Cl. ......................................... 363/43; 363/97; 323/361
[58] Field of Search ....................... 363/40, 43, 64, 95, 363/97, 98; 323/358, 359, 361

[56] References Cited

U.S. PATENT DOCUMENTS

| | | | |
|---|---|---|---|
| 3,491,282 | 1/1970 | Heinrich et al. | 321/5 |
| 3,628,123 | 12/1971 | Rosa et al. | 321/9 R |
| 3,648,149 | 3/1972 | Brown et al. | 363/64 |
| 4,366,532 | 12/1982 | Rosa et al. | 363/69 |

OTHER PUBLICATIONS

Sequence Amplitude Modulated Inverters; J. W. Bates; Abstract PESC 73 Record, pp. 222-228.

*Primary Examiner*—Steven L. Stephan
*Assistant Examiner*—Adolf Berhane
*Attorney, Agent, or Firm*—Seed and Berry

[57] ABSTRACT

A power inverter formed by several transformers having their secondary windings wired in series and their primary windings connected to respective switching bridges. The turns ratios of each of the primary windings vary from each other by a factor of 3 to provide good voltage resolution over a wide dynamic range. The switching bridges are controlled by a decoder and timing circuit which is, in turn, controlled by a microprocessor. The microprocessor closes the switches in the switching bridges in up to 27 different combinations to produce 27 different output voltages, thereby generating a relatively accurate replica of a sine wave. Voltage regulation is accomplished by sampling the A.C. voltage, comparing the magnitude of the A.C. voltage to a reference voltage, and adjusting the selection of output voltage values so that the A.C. voltage matches the reference voltage. The switching bridge may also be controlled to convert an A.C. voltage applied to the transformer secondaries to a D.C. voltage for battery charging purposes.

3 Claims, 7 Drawing Sheets

POWER INVERTER FOR GENERATING VOLTAGE REGULATED SINE WAVE REPLICA

FIELD OF THE INVENTION

This invention relates to inverters for converting D.C. power to A.C. power, and more particularly, to a power inverter capable of generating a voltage regulated replica of a sine wave.

BACKGROUND OF THE INVENTION

Power inverters have long been used to convert D.C. power to A.C. power. Generally, such inverters are used where A.C. powered devices, such as televisions, electric drills, hair dryers, and the like, are to be used, but A.C. power is not available. For example, inverters may be used to power such A.C. powered devices on boats or mobile homes, or in residences in remote locations where A.C. power lines have not been routed. In these locations, D.C. power will be available from batteries which are periodically charged, either from A.C. power as it is available or from wind, solar, or water generator sources. Battery-powered inverters may also be used to provide non-interruptable A.C. power in the event of an interruption is service from commercial power suppliers.

Early power inverters were of the electromechanical variety in which a D.C. power motor was simply coupled to an A.C. generator (alternator), with some regulation of rotational speed being provided to control frequency. Voltage regulation was then provided by controlling the alternator field current. These electromechanical power inverters were invariably large, heavy, noisy, inefficient, unreliable, and expensive.

The advent of solid-state switches, such as high current, low impedance, field effect transistors (FET's), has made practical the design of solid-state inverters. These solid-state inverters generally switched the D.C. power source to the primary winding of a step-up transformer with alternating polarities, thereby generating a higher voltage A.C. signal having the same frequency as the switching frequency. Solid-state inverters are relatively efficient in converting D.C. power to A.C. power because little power is dissipated in the switching devices. When the switching devices are open, the currents through the devices are virtually zero, so that the devices dissipate virtually no power in their "off" state. When the switching devices are closed, the voltage drops across the devices are very low, so that the devices dissipate very little power in their "on" state. The switching devices are switched rapidly between their "on" and "off" states so that they are virtually never in a linear state in which power dissipation would be substantial.

Inverter efficiency is important under both "load" and "no load" conditions. Efficiency at high loads is important because significant power is most likely to be dissipated when the inverter is outputting substantial power. For example, an inverter that is 95% efficient dissipates 100 watts when putting out 2000 watts, while only 1 watt when putting out 20 watts. Efficiency when power is not being drawn from the inverter is also important because inverters often must be continuously powered so that they can supply A.C. power on demand. Thus, although it is relatively easy to make the inverter efficient at no load, even small inefficiencies can be significant because inverters often spend most of their time in an unloaded condition.

Power inverters generally do not actively regulate their output voltages. Instead, they attempt to provide a low output impedance so that the output voltage will not drop significantly until the load impedance begins to approach the output impedance of the inverter. While this approach is satisfactory under no load conditions and even for some high load applications, it is unsatisfactory under high load conditions for many applications or where a precise A.C. voltage is required. Also, without active voltage regulation, the magnitude of the A.C. voltage will vary as a function of D.C. (battery) voltage as well as load impedance. Thus, the A.C. voltage will gradually drop as a battery supplying the D.C. power is gradually discharged.

Two approaches to voltage regulation would be to vary either the duty cycle that the D.C. power is switched to the transformer or the magnitude of the D.C. current flowing through the primary of the transformer. Each of these approaches has serious disadvantages and limitations. For example, controlling the magnitude of the D.C. current flowing through the primary of the transformer generally requires that solid-state circuits operate in their linear region, thus dissipating substantial power. As a result, conventional inverters have not provided a relatively inexpensive and efficient means of generating A.C. power having a precisely regulated voltage.

Most conventional power inverters do not generate a waveform that replicates a sine wave of the type provided by electric utilities. Instead, inverters generally output a 60 Hz square wave with leading and trailing edges corresponding to the times that the D.C. power is switched to the inverter's transformer. While many A.C. appliances are capable of satisfactory operation when powered by a square wave, some must be powered by a closer approximation of a sine wave. Also, the high-frequency spectral components in a 60 Hz square wave applied to an A.C. appliance can cause interference in radio receivers used in such devices as televisions, communications radios, cellular telephones, and the like.

Some more sophisticated inverters attempt to more closely replicate a sine wave by generating a "modified sine wave," which is simply a square wave having a dead band between positive and negative cycles. Inverters generating a modified sine wave having a dead band are able to provide some voltage regulation by varying the duty cycle of the dead band. However, these modified sine waves still contain significant high frequency spectral components which can also cause radio frequency interference.

As mentioned above, power inverters often receive D.C. power from batteries. These batteries are sometimes charged by a battery charger from A.C. power intermittently supplied by an electric utility or an on-board, motor-driven alternator (genset). Some conventional power inverters are adapted to also function as a battery charger. In these combination inverter-chargers, A.C. power is supplied to the secondary winding of the inverter's transformer, and either the switches are operated in synchronism with the A.C. power, or diodes are provided to rectify the lower voltage A.C. power on the secondary of the transformer.

SUMMARY OF THE INVENTION

It is an object of the invention to provide a power inverter that is capable of generating a waveform that closely resembles a sine wave.

It is another object of the invention to provide a power inverter that precisely regulates the magnitude of the voltage output by the inverter despite variations in the magnitude of the D.C. voltage applied to the inverter.

It is another object of the invention to provide a power inverter that precisely regulates the magnitude of the voltage output by the inverter even under high or varying load conditions.

It is still another object of the invention to provide a power inverter design that can be adapted easily to a wide variety of D.C. source voltages and A.C. output voltages, and a wide variety of output waveforms.

It is a further object of the invention to provide an inverter for generating a voltage regulated replica of a sine wave that can be easily adapted to generate D.C. power from A.C. power for battery charging purposes.

These and other objects of the invention are provided by a power inverter for converting a D.C. voltage to an A.C. voltage having a predetermined frequency and amplitude. The inverter includes a plurality of primary transformer windings coupled by respective turns ratios to respective secondary transformer windings wired in series. As a result, the voltage across the secondary transformer windings is proportional to the sum of the products of the turns ratio of each of the transformers and the voltage applied thereto. The flow of current through the primary transformer windings is controlled by first and second pairs of series-connected semiconductor switches connected between a D.C. voltage, with respective ends of the primary transformer winding connected to the junctions between the semiconductor switches in each pair. The switches are operated by a control signal generator which generates three sets of control signals to control the presence and direction of current flow through the primary transformer winding. During a first state, the control signal generator produces a first set of control signals to close the switch connected to a first polarity of D.C. voltage in the first pair of semiconductor switches, to close the switch connected to a second opposite polarity of D.C. voltage in the second pair of semiconductor switches, and to open the remaining semiconductor switches. During a second state, the control signal generator produces a second set of control signals to close the switch connected to the second polarity of D.C. voltage in the first pair of semiconductor switches, to close the switch connected to the first polarity of D.C. voltage in the second pair of semiconductor switches, and to open the remaining semiconductor switches. Finally, during a third state, the control signal generator produces a third set of control signals, shorting the primary thereby allowing current to flow through the primary transformer winding. The first, second, and third states for each primary transformer winding are generated in a predetermined combination as a function of time so that an A.C. signal having a predetermined amplitude and waveform, preferably a sine wave, is generated across the secondary transformer winding. Although the turns ratio of each primary transformer winding may be the same, they are preferably different from each other to maximize the range and resolution of the A.C. voltage generated by the inverter.

The control signal generator may be a hard-wired circuit or it may include a microprocessor with a memory storing a lookup table having a plurality of sets of data, each of which corresponds to a predetermined combination of control signal states for the primary transformer windings. The use of a several data tables, each of which contains the plurality of sets of data corresponding to a sine wave having a respective amplitude, allows the A.C. voltage to be regulated by selecting one set of data, depending upon the deviation of the A.C. voltage from a desired A.C. voltage.

The inverter may also function as a battery charger by converting an A.C. voltage to a D.C. voltage. In accordance with this aspect of the invention, a battery charger control circuit samples said A.C. voltage to determine its frequency and phase, and then generates the first set of control signals when the A.C. voltage has one polarity and the second set of control signals when the A.C. voltage has the opposite polarity.

DETAILED DESCRIPTION OF THE PREFERRED EMBODIMENT

Figure 1:
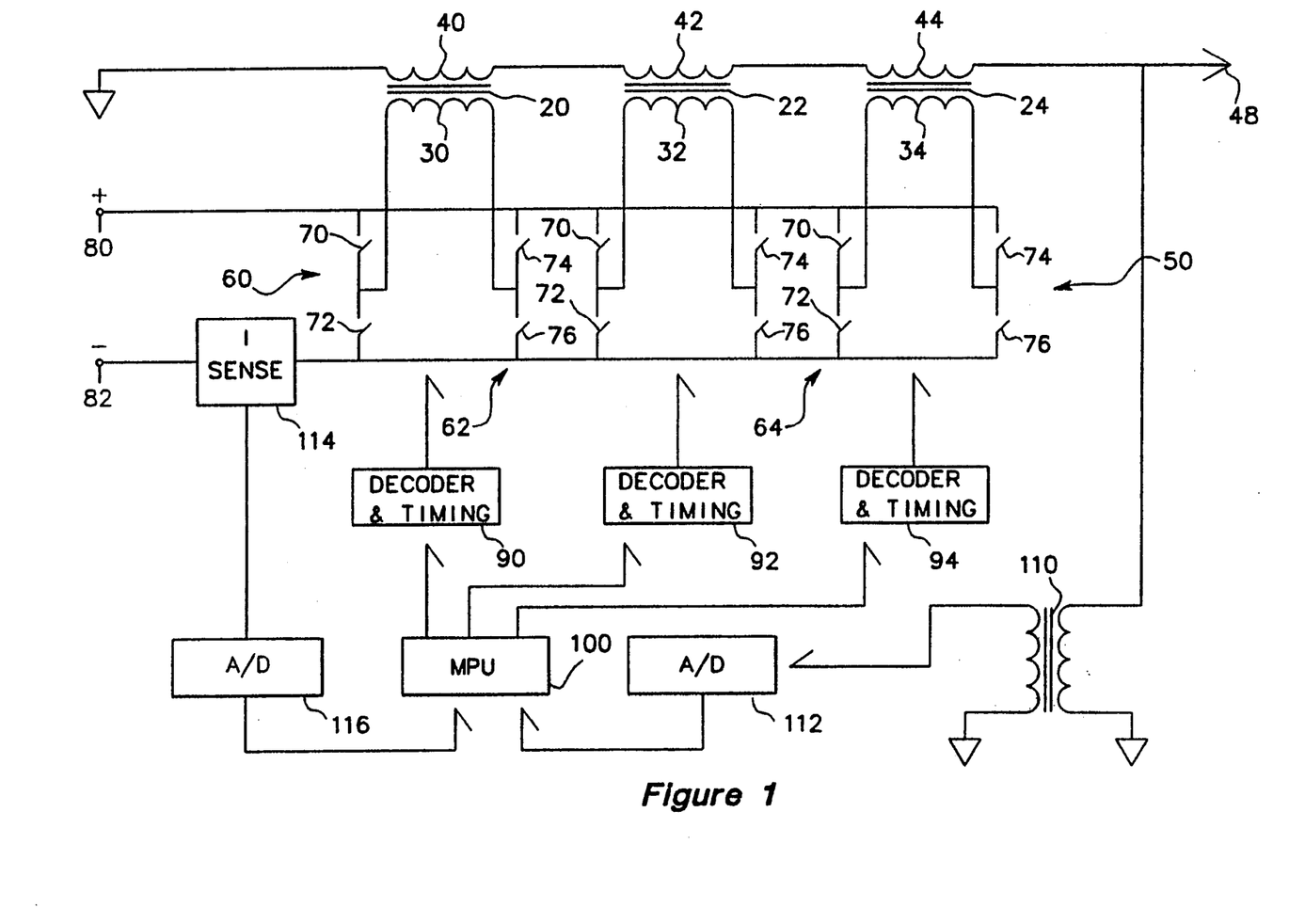
FIG. 1 is a block diagram of one embodiment of the inverter of the present invention.

One embodiment of the inventive power inverter is illustrated in FIG. 1. Although two or more transformers or transformer windings can be used to implement the inventive power inverter, the embodiment of FIG. 1 uses three separate transformers 20, 22, and 24. Each of these transformers 20, 22, and 24 includes respective primary windings 30, 32, and 34, and respective secondary windings 40, 42, and 44. The secondary windings 40, 42, 44 are connected in series with each other between ground and an A.C. output terminal 48.

The primary windings 30, 32, 34 are connected to a switching circuit 50 having respective switching bridges, 60, 62, and 64. Each switching bridge 60, 62, 64 includes four solid-state switches 70, 72, 74, and 76 which are preferably conventional high current, low impedance, field effect transistors (FET's). The upper terminals of the switches 70, 74 are connected to one polarity of a D.C. source applied through a positive D.C. terminal 80; the lower terminals of the switches 72, 76 are connected to the other polarity of the D.C. source applied through a negative D.C. terminal 82; and the respective junctions between series-connected switches 70, 72 and 74, 76 are connected to opposite terminals of the primary winding 30, 32, 34 of the respective switching bridge 60, 62, 64.

The switches 70-74 in each switching bridge 60, 62, 64 are controlled by respective decoder and timing circuits 90, 92, and 94. These circuits 90, 92, 94 are, in turn, controlled by a respective two-bit digital word output by a conventional microprocessor 100. The operation of the microprocessor 100 is controlled by a computer program which is described below.

As will also be explained below, the inverter regulates the magnitude of the A.C. voltage generated across the secondary transformer windings 40–44. In order to sample the magnitude of this A.C. voltage, the A.C. voltage is applied through a step-down transformer 110 to a conventional analog-to-digital (A/D) converter 112 which samples the A.C. voltage to generate periodic digital words at its output indicative of the voltage of the A.C. signal when each sample is taken. Alternatively, the output of the transformer 110 could be rectified and low-pass filtered to allow a reduction in the sampling frequency. In either case, the digital word indicative of the magnitude of the A.C. voltage is applied to the microprocessor 100 so that the microprocessor can control the operation of the switching circuit 50 to adjust the magnitude of the A.C. voltage. The transformer 110 and A/D converter 112 also allow the microprocessor 100 to sample the frequency and phase of the A.C. voltage to cause the inverter to function as a battery charger, as also described in detail below. Regulation of the charging current when the inverter is functioning as a battery charger is accomplished by sensing the charging current with a conventional current sensor 114. The current sensor 114 outputs an analog voltage indicative of charging current which is applied to a second conventional analog-to-digital (A/D) converter 116. The A/D converter 116 outputs to the microprocessor 100 a digital word indicative of charging current. The microprocessor 100 can then select one of several tables to control the combination of primary transformer windings 30–34 to regulate the charging current.

With further reference to FIG. 1, each of the switching bridges 60–64 operates in one of three switching states. In a first state, switch 70 is closed, switch 76 is closed, and the remaining switches 72, 74 are open. This state causes current to flow through the respective primary transformer windings 30–34 from left to right, as illustrated in FIG. 1. In a second state, switch 72 is closed, switch 74 is closed, and the remaining switches 70, 76 are open. This state causes current to flow through the respective primary transformer windings 30–34 from right to left, as illustrated in FIG. 1. Finally, in a third state, the switches 72 and 76 are used to short the respective primary transformer windings 30–34, thus placing zero volts across the primary transformer windings. During this time, the switches 70 and 74 are, of course, open.

The three states of the switching bridges 60–64 can be designated by a two-bit binary word, i.e., 00, 01, and 10 (the fourth word, 11, is unneeded). These two-bit binary words designating the state of each switching bridge 60–64 are generated by the microprocessor 100. The function of the decoder and timing circuits 90–94 is primarily to convert the two-bit words to four binary signals for each bridge 60–64 to control the state of the four corresponding switches 70–76 in each bridge 60–64.

Although the three primary transformer windings 30, 32, 34 may have the same turns ratio, they preferably have turns ratios that are multiples of each other in order to provide both good resolution and wide dynamic range of the A.C. signal generated by the inverter.

As mentioned above, each switching bridge 60–64 has three switching states which cause respective voltages of $+V*T$, $-V*T$, and 0 to be generated across its secondary transformer winding, where V is the magnitude of the D.C. voltage and T is the turns ratio of the primary transformer winding 30–34. The three states of each of the three switching bridges 60–64 can be combined in 27 different combinations, thus yielding 27 different voltages across the secondary transformer windings 40–44. These combinations can be represented by the following table of values of a six-bit binary word generated by the microprocessor 100:

TABLE 1

| | | |
|---|---|---|
| 00 00 00 | 00 00 01 | 00 00 10 |
| 01 00 00 | 01 00 01 | 01 00 10 |
| 10 00 00 | 10 00 01 | 10 00 10 |
| 00 01 00 | 00 01 01 | 00 01 10 |
| 01 01 00 | 01 01 01 | 01 01 10 |
| 10 01 00 | 10 01 01 | 10 01 10 |
| 00 10 00 | 00 10 01 | 00 10 10 |
| 01 10 00 | 01 10 01 | 01 10 10 |
| 10 10 00 | 10 10 01 | 10 10 10 |

More generally, an inverter having N primary transformer windings is capable of generating $3^N$ combinations of different voltages across the secondary transformer windings 40–44.

Figure 2:
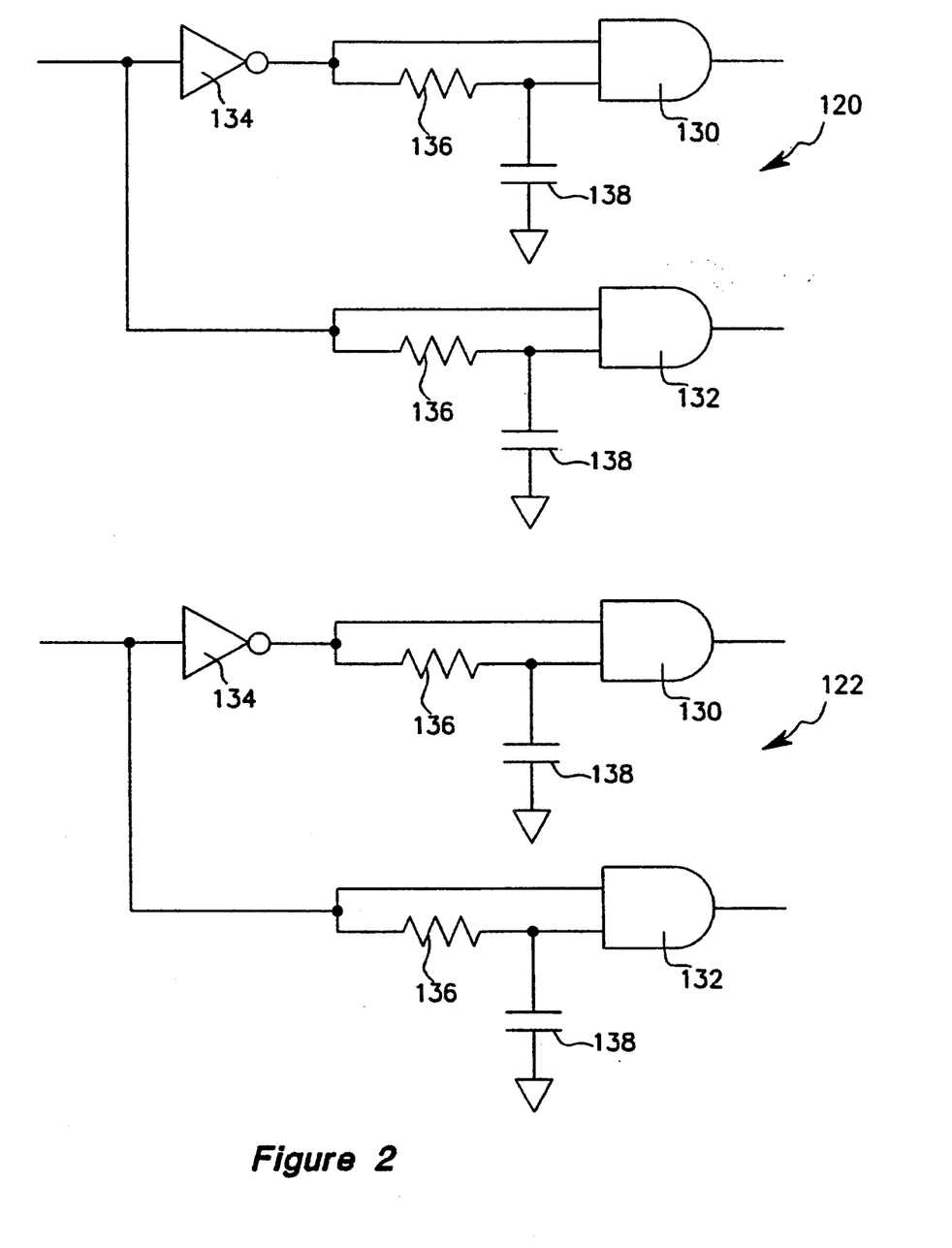
FIG. 2 is a schematic of a decoder and timer circuit used in the embodiment of the invention of FIG. 1.

With reference now to FIG. 2, each of the decoder and timing circuits 90–94 includes two drive circuits 120, 122, each of which includes a pair of AND-gates 130, 132 which are driven out of phase because the control signal from the microprocessor 100 is applied to the AND-gate 130 through an inverter 134. The output of AND-gate 130 for drive circuit 120 is applied to switch 70, and the output of AND-gate 132 for drive circuit 120 is applied to switch 72. Similarly, the output of AND-gate 130 for drive circuit 122 is applied to switch 74, and the output of AND-gate 132 for drive circuit 122 is applied to switch 76. As a result, only one switch 70 or 72 and 74 or 76 of each leg of each switching bridge 60–64 is closed at a time.

It will be apparent from an examination of the switching bridges 60–64 that simultaneous closure of both switches 70 and 72 or 74 and 76 would cause a direct short-circuit between the D.C. terminals 80, 82. It is therefore important to make sure that both switches 70 and 72 or 74 and 76 are never closed at the same time. This function is accomplished in the drive circuits 120, 122 by applying logic signals to the AND-gates 130, 132 through a low pass filter network composed of resistor 136 and capacitor 138. When a logic "1" is applied to the AND-gates 130, 132, the "0" to "1" transition is immediately coupled to one input of the AND-gates 130, 132. However, the other input of the AND-gates 130, 132 does not go to a logic "1" level until the capacitor 138 has been charged sufficiently through resistor 136. Thus there is a delay for a period determined by the RC time constant of the resistor 136 and capacitor 138 before the output of the AND-gates 130, 132 are switched to logic "1."

When a logic "0" is applied to the AND-gates 130, 132, the "1" to "0" transition is immediately coupled to one input of the AND-gates 130, 132, thereby immediately causing the output of the AND-gates 130, 132 to switch to a logic "0" which turns off the switch 70–76 connected to the AND-gate 130, 132. The immediate switching of the AND-gates 130, 132 from a logic "1" to a logic "0," coupled with the delayed switching of the AND-gates 130, 132 from a logic "0" to a logic "1," produces a "dead band" any time the switching bridges 60–64 are switched between their first and second states as described above. This dead band makes it virtually impossible for both switches 70–76 to be on at the same time, thereby preventing direct short-circuits between the D.C. terminals 80, 82.

Figure 3:
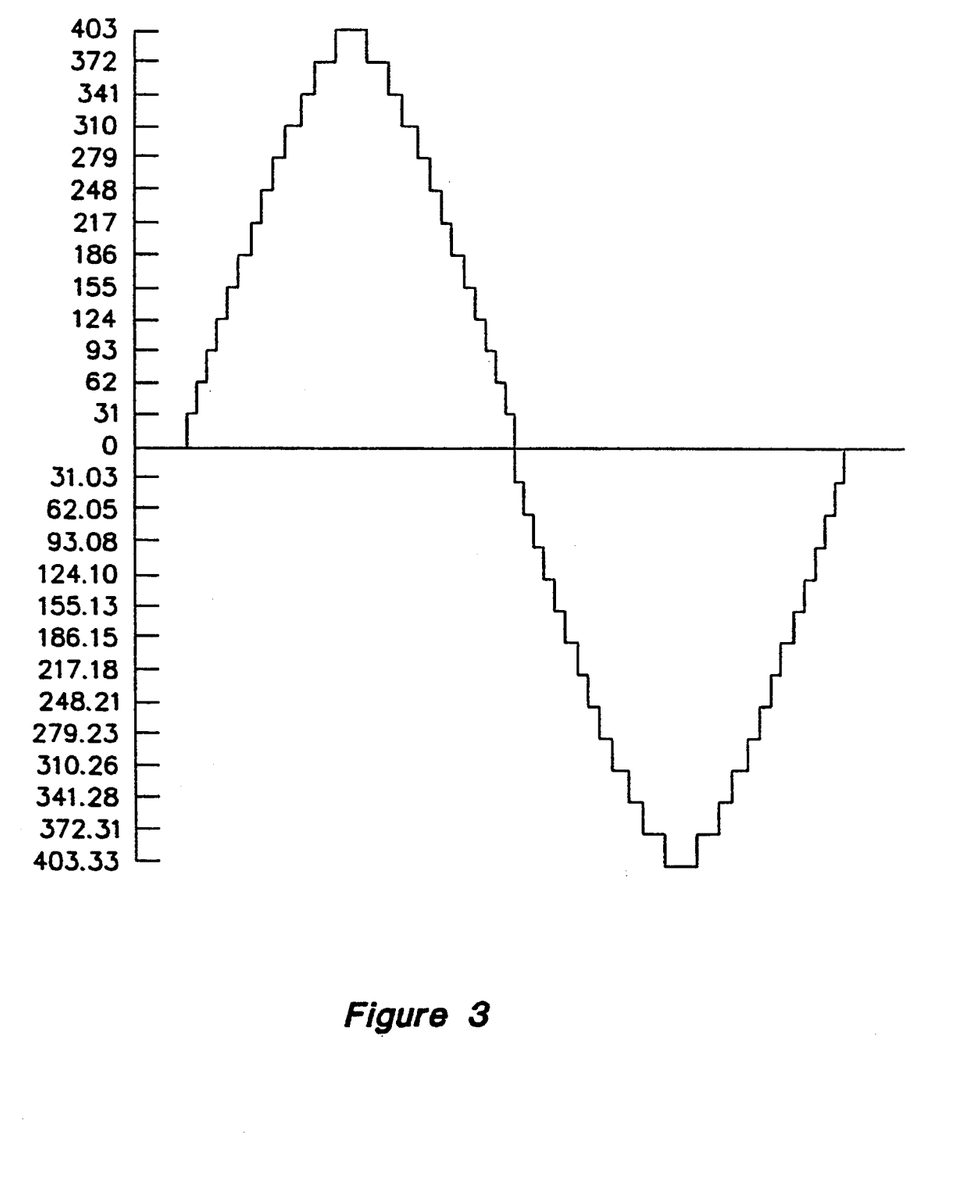
FIG. 3 is a diagram showing the A.C. waveform generated by the embodiment of the invention of FIG. 1.

An A.C. signal generated by the preferred embodiment of the inverter illustrated in FIG. 1 is illustrated in FIG. 3. The waveform shown in FIG. 2 replicates a 138 Volt RMS sine wave with 27 different voltage levels thus producing a waveform that is substantially more accurate than conventional inverter circuits generating a square wave or modified sine wave.

One example of the states of the switching bridges 60-64 and the corresponding voltages across the secondary transformer windings 40-44 is shown in Table 2 as follows:

TABLE 2

| Volts Output | State XF1 | State XF2 | State XF3 | BIT 1 | 2 | 3 | 4 | 5 | 6 |
|---|---|---|---|---|---|---|---|---|---|
| 195 | plus | plus | plus | 0 | 1 | 0 | 1 | 0 | 1 |
| 180 | zero | plus | plus | 0 | 0 | 0 | 1 | 0 | 1 |
| 165 | minus | plus | Pius | 1 | 0 | 0 | 1 | 0 | 1 |
| 150 | plus | zero | plus | 0 | 1 | 0 | 0 | 0 | 1 |
| 135 | zero | zero | plus | 0 | 0 | 0 | 0 | 0 | 1 |
| 120 | minus | zero | plus | 1 | 0 | 0 | 0 | 0 | 1 |
| 105 | plus | minus | plus | 0 | 1 | 1 | 0 | 0 | 1 |
| 90 | zero | minus | plus | 0 | 0 | 1 | 0 | 0 | 1 |
| 75 | minus | minus | plus | 1 | 0 | 1 | 0 | 0 | 1 |
| 60 | plus | plus | zero | 0 | 1 | 0 | 1 | 0 | 0 |
| 45 | zero | plus | zero | 0 | 0 | 0 | 1 | 0 | 0 |
| 30 | minus | plus | zero | 1 | 0 | 0 | 1 | 0 | 0 |
| 15 | plus | zero | zero | 0 | 1 | 0 | 0 | 0 | 0 |
| 0 | zero | zero | zero | 0 | 0 | 0 | 0 | 0 | 0 |
| −15 | minus | zero | zero | 1 | 0 | 0 | 0 | 0 | 0 |
| −30 | plus | minus | zero | 0 | 1 | 1 | 0 | 0 | 0 |
| 45 | zero | minus | zero | 0 | 0 | 1 | 0 | 0 | 0 |
| −60 | minus | minus | zero | 1 | 0 | 1 | 0 | 0 | 0 |
| −75 | plus | plus | minus | 0 | 1 | 0 | 1 | 1 | 0 |
| −90 | zero | plus | minus | 0 | 0 | 0 | 1 | 1 | 0 |
| −105 | minus | plus | minus | I | 0 | 0 | 1 | 1 | 0 |
| −120 | plus | zero | minus | 0 | 1 | 0 | 0 | 1 | 0 |
| −135 | zero | zero | minus | 0 | 0 | 0 | 0 | 1 | 0 |
| −150 | minus | zero | minus | 1 | 0 | 0 | 0 | 1 | 0 |
| −165 | plus | minus | minus | 0 | 1 | 1 | 0 | 1 | 0 |
| −180 | zero | minus | minus | 0 | 0 | 1 | 0 | 1 | 0 |
| −195 | minus | minus | minus | 1 | 0 | 1 | 0 | 1 | 0 |

As shown in Table 2, each of 27 different voltage values can be generated by appropriate selection of a combination of states of the switching bridges 60-64.

The timing of when and for how long the 27 different voltage values are selected can be adjusted to regulate the magnitude of the A.C. voltage generated across the secondary transformer windings 40-44. Regulation can be accomplished in two different ways. First, regulation can be accomplished by adjusting the number of higher voltage values that are selected so that a only a relatively small number of lower voltage values are used for low load conditions. As the load increases, voltage regulation is accomplished by increasing the number of higher voltage values selected. With this technique, the output waveform will more closely resemble a square wave at relatively low A.C. loads, and will more closely resemble a sine wave at relatively high A.C. loads when additional, higher voltage values are used.

One example of a table containing several lists or schedules of voltages for implementing the technique described above is illustrated in FIG. 3, as follows:

TABLE 3

| LIST NUMBER | | | | | | | | |
|---|---|---|---|---|---|---|---|---|
| 1 | 2 | 3 | 4 | 5 | 6 | 7 | 8 | 9 |
| 195 | 180 | 165 | 150 | 135 | 120 | 105 | 90 | 75 |
| 180 | 165 | 150 | 135 | 120 | 105 | 90 | 75 | 60 |
| 165 | 150 | 135 | 120 | 105 | 90 | 75 | 60 | 45 |
| 150 | 135 | 120 | 105 | 90 | 75 | 60 | 45 | 30 |
| 135 | 120 | 105 | 90 | 75 | 60 | 45 | 30 | 15 |
| 120 | 105 | 90 | 75 | 60 | 45 | 30 | 15 | 0 |
| 105 | 90 | 75 | 60 | 45 | 30 | 15 | 0 | −15 |
| 90 | 75 | 60 | 45 | 30 | 15 | 0 | −15 | −30 |
| 75 | 60 | 45 | 30 | 15 | 0 | −15 | −30 | −45 |
| 60 | 45 | 30 | 15 | 0 | −15 | −30 | −45 | −60 |
| 45 | 30 | 15 | 0 | −15 | −30 | −45 | −60 | −75 |
| 30 | 15 | 0 | −15 | −30 | −45 | −60 | −75 | |
| 15 | 0 | −15 | −30 | −45 | −60 | −75 | −90 | |
| 0 | −15 | −30 | −45 | −60 | −75 | −90 | | |
| −15 | −30 | −45 | −60 | −75 | −90 | −105 | | |
| −30 | −45 | −60 | −75 | −90 | −105 | | | |
| −45 | −60 | −75 | −90 | −105 | −120 | | | |
| −60 | −75 | −90 | −105 | −120 | | | | |
| −75 | −90 | −105 | −120 | −135 | | | | |
| −90 | −105 | −120 | −135 | | | | | |
| −105 | −120 | −135 | −150 | | | | | |
| −120 | −135 | −150 | | | | | | |
| −135 | −150 | −165 | | | | | | |
| −150 | −165 | | | | | | | |
| −165 | −180 | | | | | | | |
| −180 | | | | | | | | |
| −195 | | | | | | | | |

As shown in Table 3, list 1 contains a relatively large number of voltage values covering a relatively wide range, while list 9 contains a relatively small number of voltage values covering a substantially smaller range. List 9 would be selected at relatively low A.C. loads when the A.C. voltage is likely to be relatively high, while list 1 would be selected at relatively high A.C. loads when the A.C. voltage is likely to be relatively low. Each of the lists contains values for one-half of an AC cycle. Thus, for each cycle, the selected list is read in one direction and then in the opposite direction.

With further reference to Table 3, the 27 voltage values in list 1 must be selected over the same duration that the 11 voltage values shown in list 9 are selected so that both lists will produce A.C. voltages having the same frequency. It will thus be apparent from an examination of Table 3 that the duration and timing of the voltage value selections must vary from list to list. An example of a timing list for the selecting the voltage values shown in Table 3 to generate a 60 Hz A.C. voltage is shown in the following Table 4:

TABLE 4

| | | | LIST NUMBER | | | | | |
|---|---|---|---|---|---|---|---|---|
| 1 | 2 | 3 | 4 | 5 | 6 | 7 | 8 | 9 |
| .00105 | .00109 | .00114 | .00120 | .00126 | .00134 | .00144 | .00155 | .00171 |
| .00044 | .00046 | .00049 | .00051 | .00054 | .00058 | .00062 | .00068 | .00075 |
| .00035 | .00036 | .00038 | .00040 | .00043 | .00046 | .00050 | .00055 | .00062 |
| .00030 | .00031 | .00033 | .00035 | .00037 | .00040 | .00044 | .00049 | .00056 |
| .00027 | .00028 | .00030 | .00032 | .00034 | .00037 | .00041 | .00046 | .00053 |
| .00025 | .00026 | .00028 | .00030 | .00032 | .00035 | .00039 | .00044 | .00053 |
| .00024 | .00025 | .00026 | .00028 | .00031 | .00034 | .00038 | .00044 | .00056 |
| .00023 | .00024 | .00025 | .00027 | .00030 | .00033 | .00038 | .00046 | .00062 |
| .00022 | .00023 | .00025 | .00027 | .00030 | .00033 | .00039 | .00049 | .00075 |
| .00021 | .00023 | .00024 | .00027 | .00030 | .00034 | .00041 | .00055 | .00171 |
| .00021 | .00022 | .00024 | .00027 | .00030 | .00035 | .00044 | .00068 | |
| .00021 | .00022 | .00024 | .00027 | .00031 | .00037 | .00050 | .00155 | |
| .00020 | .00022 | .00024 | .00027 | .00032 | .00040 | .00062 | | |
| .00020 | .00022 | .00025 | .00028 | .00034 | .00046 | .00144 | | |
| .00021 | .00023 | .00025 | .00030 | .00037 | .00058 | | | |
| .00021 | .00023 | .00026 | .00032 | .00043 | .00134 | | | |
| .00021 | .00024 | .00028 | .00035 | .00054 | | | | |
| .00022 | .00025 | .00030 | .00040 | .00126 | | | | |
| .00023 | .00026 | .00033 | .00051 | | | | | |
| .00024 | .00028 | .00038 | .00120 | | | | | |
| .00025 | .00031 | .00049 | | | | | | |
| .00027 | .00036 | .00114 | | | | | | |
| .00030 | .00046 | | | | | | | |
| .00035 | .00109 | | | | | | | |
| .00044 | | | | | | | | |
| .00105 | | | | | | | | |

The software for controlling the operation of the microprocessor 100 is illustrated in FIG. 4. The program is entered at 140 where conventional initialization procedures occur to set various registers and flags to predetermined values. The program then causes the microprocessor 100 to read the output of the A/D converter 112 at 142 and check for the presence of an A.C. voltage across the secondary transformer windings 40–44 at 144. If an A.C. voltage is present, the inverter will function as a battery charger and will follow the path to the right, designated by "C." This path will be described in detail below.

If an A.C. is not found to be present at 144, the inverter will function as an inverter by first comparing the voltage corresponding to the inverter output with a minimum voltage reference value $V_{min}$ at 146. If the output voltage is too low, the program branches to 148, where a list generating the next highest output voltage is selected. For example, if the current list was list 4 in Table 3, list 3 would then be selected.

If the output voltage is not determined at 146 to be too low, the program proceeds to 150, where the voltage corresponding to the inverter output is compared to a maximum voltage reference value $V_{max}$. If the output voltage is too high, the program branches to 152, where a list generating the next lowest output voltage is selected. For example, if the current list was list 4 in Table 3, list 5 would then be selected.

If the output voltage is not determined at 150 to be too high, the program proceeds to 156, where the current list (i.e., the last list selected) is used. For the first pass through the program, the current list will be a default list selected in the initialization procedure at 140.

After a proper list of voltage values has been selected, the program loads at 158 the number of voltage values $N_{MAX}$ in the selected voltage value list and sets a value index N equal to 1 corresponding to the first value in the list at 160. For example, in list 3 of Table 3, the number of voltage values $V_{MAX}$ is 23 and the voltage value for N=1 is 165. A flag UPFLAG is then set to "1" at 161 to designate that the selected list should be read initially in one direction during the first half of the A.C. cycle.

The program then proceeds to 162, where the microprocessor 100 outputs to the decoder and timing circuits 90–94 the control bits corresponding to the current voltage value. These control bits are shown in Table 2 for one embodiment of the invention. For example, for a current voltage value of 165, the microprocessor 100 would output the bits "10 01 01."

The microprocessor 100 will continue to output the control bits until a new voltage value is selected from the list. A new voltage value will not be selected until a predetermined delay implemented by steps 166–170 has expired. An internal counter in the microprocessor 100 is loaded with an appropriate delay time T from Table 4 at 166, and the value T is then checked at 168. If T is not found at 168 to be equal to 0, it is decremented at 170 and then rechecked at 168. The value T is repetitively decremented at a known, fixed rate until the delay time T has been decremented to 0, at which point the program proceeds to 171. An example of an appropriate delay time for the first voltage value of list 3 is shown in Table 4 as 1.14 ms. The particular selection of a value T is arbitrary and will depend upon the rate that the value T is decremented. For example, T could be 114 for a 100 kHz decrement rate or 1140 for a 1 MHz decrement rate.

After the delay time T has been decremented to 0, the state of the UPFLAG is checked at 171 to determine whether the voltage value index N is to be incremented (during the first half of the A.C. cycle) or decremented during the last half of the A.C. cycle. Assuming that the UPFLAG is still equal to "1," the voltage value index N is incremented at 172 to select the next voltage value in the selected list. For example, for list 3 in Table 3, the next (i.e., N=2) voltage value would be 150. The program then checks at 174 to determine if the previously selected voltage value was the final value, thus indicating that all of the voltage values for one-half cycle of a waveform have been output. For example, for list 3 of Table 3, $N_{MAX}$ is 23. As a result, after the voltage value 22 was output at 162, the value N would be incremented to 23 at 172 and compared to 23 (i.e., $N_{MAX}$) at 174. The program would then set the UPFLAG flag to "0" at 175 and return to 162 to output the voltage for voltage value index 23. After that voltage has been output for the requisite period, as determined by steps 166-170, the program branches from 171 to 180 since the UPFLAG had been set to "0," thus indicating that the selected list in Table 3 is to be read in the reverse order during the second half of the A.C. cycle. The voltage value index N is decremented (initially to 22) at 180, and the program then checks for the final value at 182. Assuming that the final value has not yet been reached, the program returns to 162 to output the voltage value corresponding to the voltage value index N. When N=1 is reached, the first voltage value in the selected list is output at 162, N is decremented to "0" at 180, and the comparison at 182 causes the program to return to 142 and 144 to verify that the inverter should continue to function as an inverter rather than a battery charger, and to 146-156 to select an appropriate list, depending upon what correction, if any, must be made to the magnitude of the A.C. voltage, as explained above. The program then generates another full cycle, as explained above.

Figure 4A:
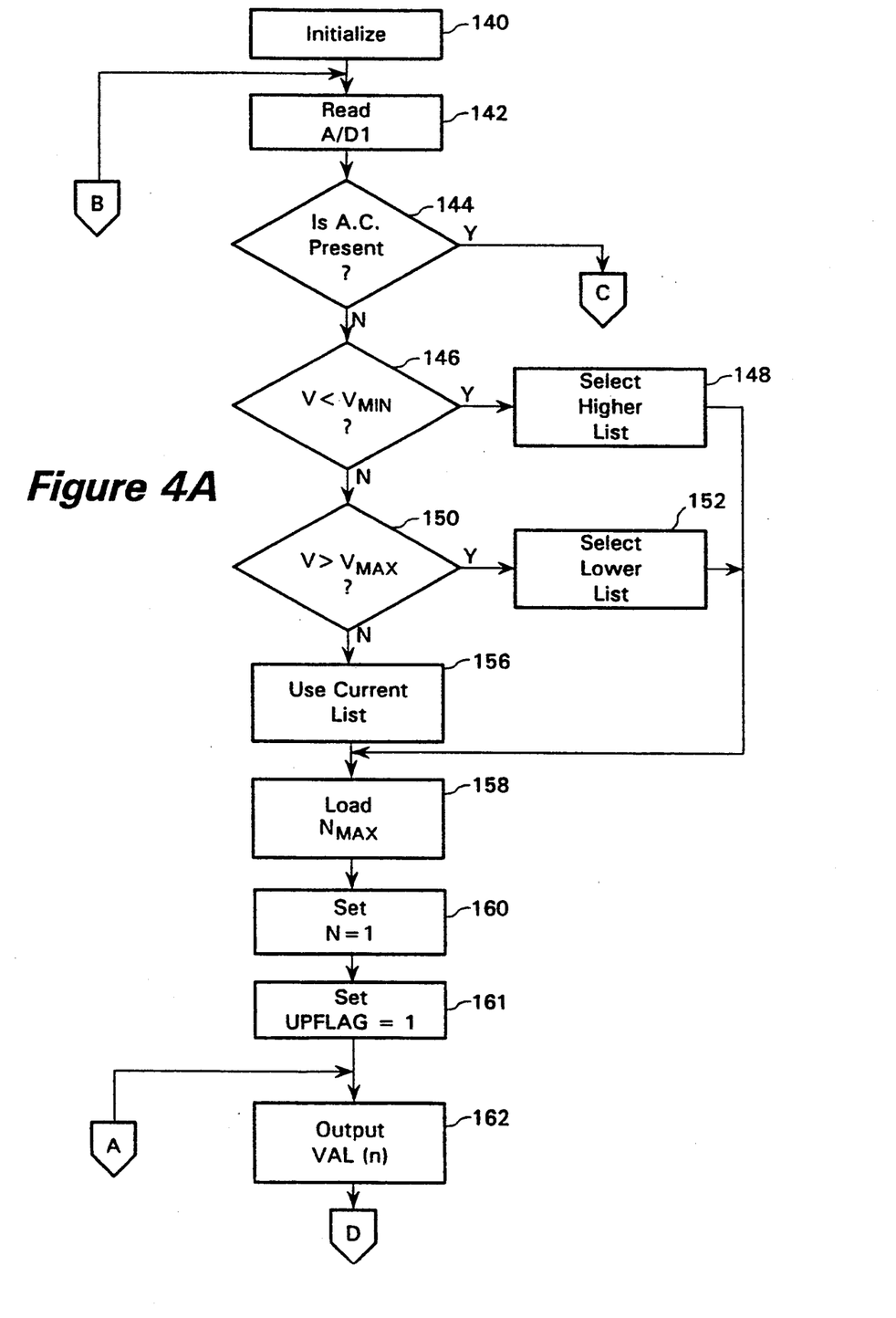
FIG. 4A-D are flow charts of the software used to program a processor used in the embodiment of the invention of FIG. 1.
Figure 4B:
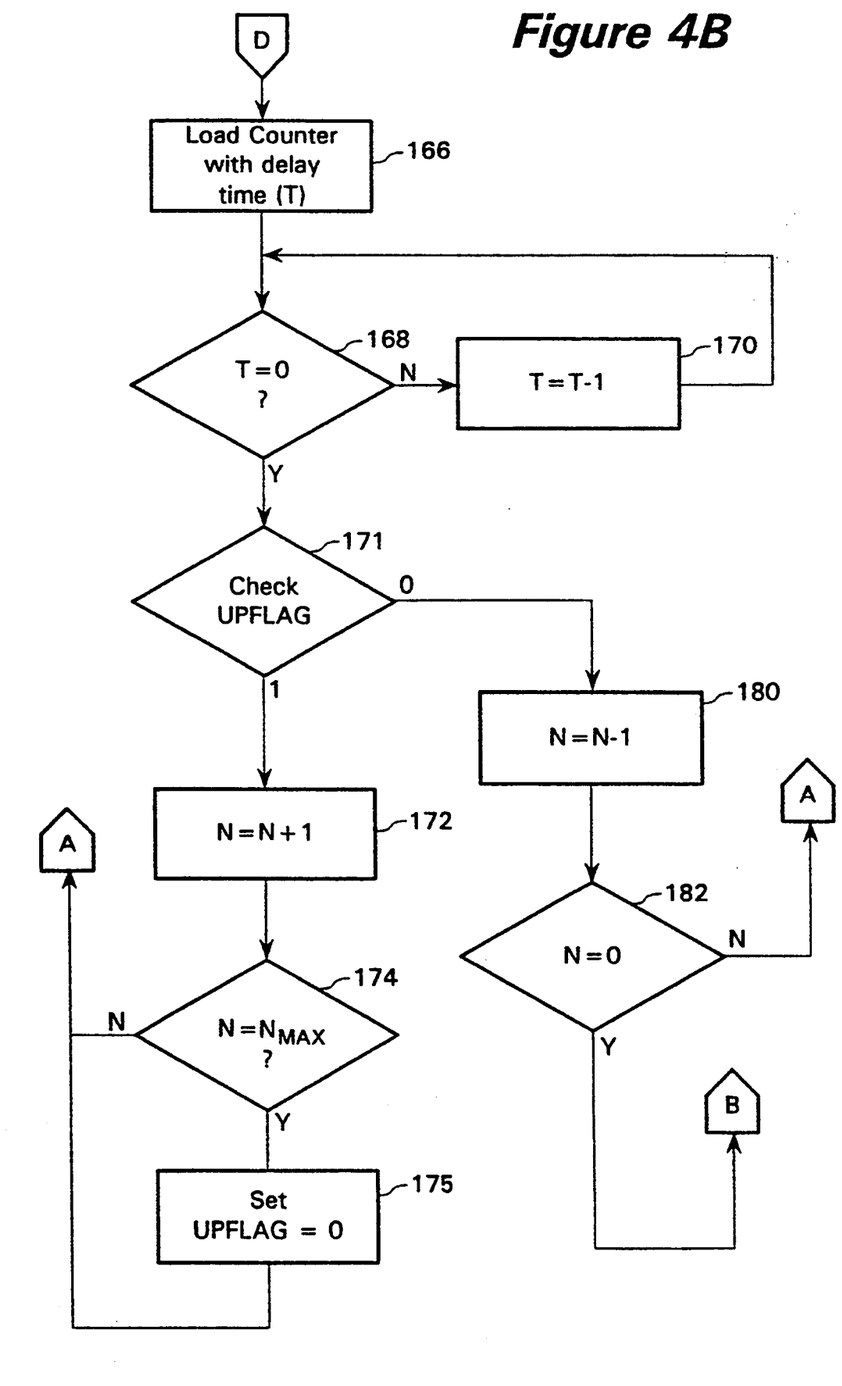
Figure 4C:
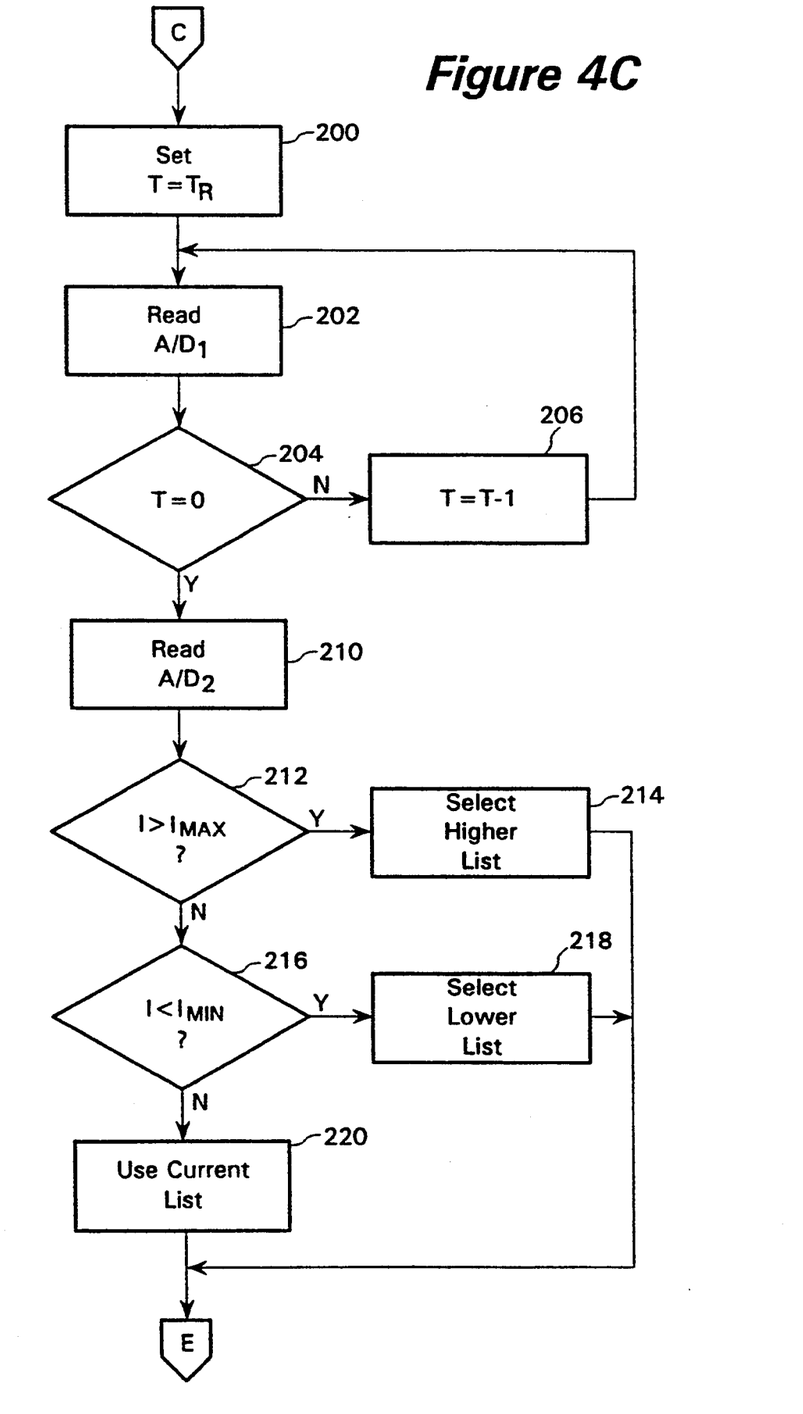
Figure 4D:
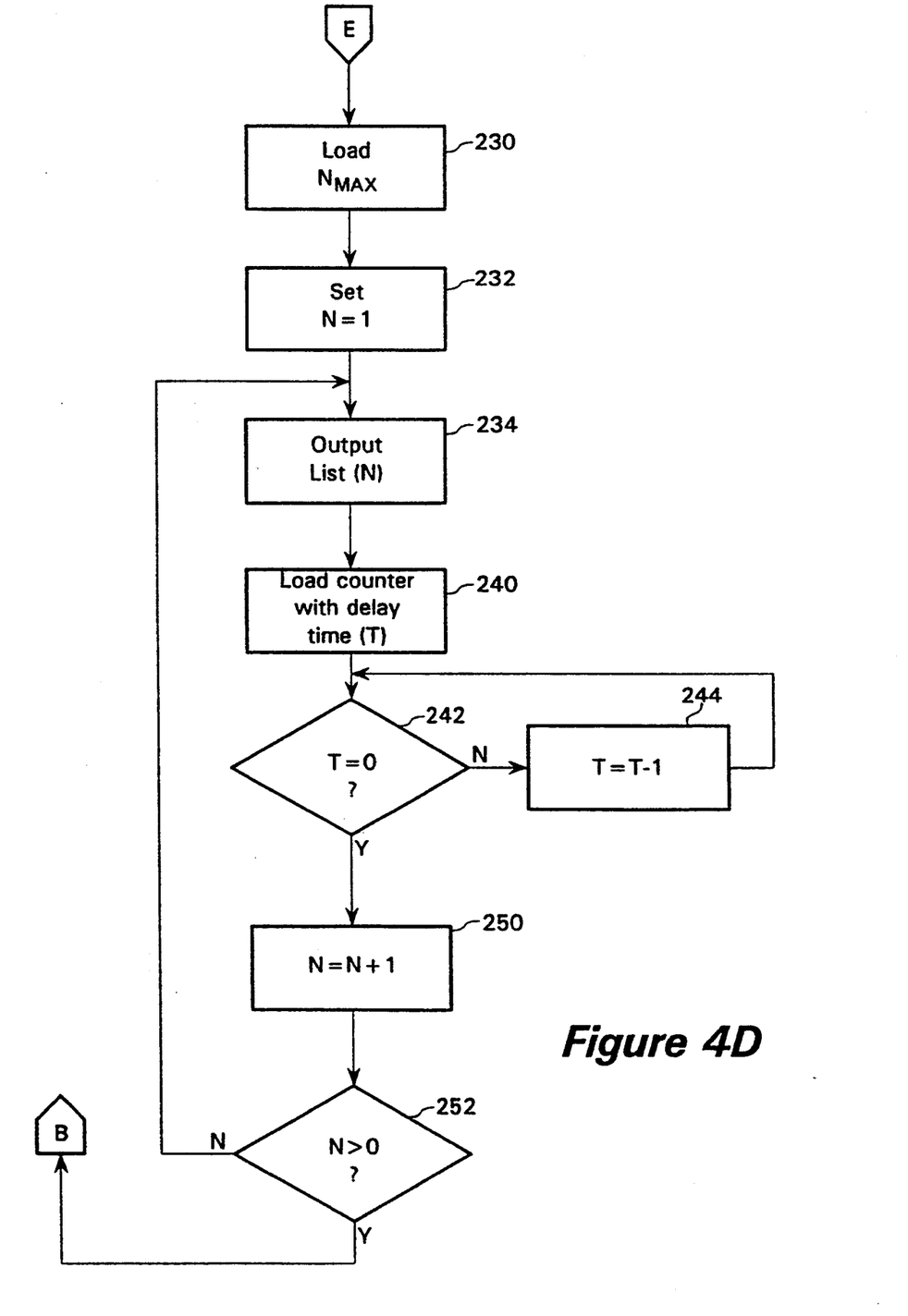

As mentioned above, the program checks at 144 to determine if an A.C. signal is being applied to the A.C. terminal 48. If so, the inverter functions as a battery charger by branching to "C" (FIG. 4C). The operation of the inverter in its battery charging mode is similar to its operation in its inverter mode. However, in the battery charging mode, the timing of the control bits that the microprocessor 100 applies to the switching bridges 60-64 must be synchronized to the frequency and phase of the A.C. voltage that is being applied to the inverter. This synchronization function is accomplished by periodically sampling the A.C. voltage over a period of time in steps 200-206 to determine its frequency and phase. A sample time variable $T_R$ is first set to an appropriate value at 200. The A/D converter 112 (FIG. 1) is read by the microprocessor 100 at 202, and the time T is compared to 0 at 204. If the time T is determined at 204 to be still greater than 0, it is decremented at 206 and the A/D converter 112 is once again read at 202. In this manner, the A/D converter 112 will be repetitively read at 202 until the time T has been decremented to 0. The microprocessor 100 will then have sufficient data to determine the frequency and phase of the A.C. voltage being applied to the inverter.

After the frequency and phase of the A.C. voltage have been determined, the current sensing A/D converter 116 (FIG. 1) is read by the microprocessor 100 at 210 to determine the charging current. The charging current I is then compared to a maximum reference value $I_{MAX}$ at 212. If the current I is greater than $I_{MAX}$, the next higher list is selected at 214. The "next higher list" is the list that provides a greater step up in voltage from the primary transformer windings 30-34 to the secondary transformer windings 40-44. For example, for list 3 of Table 3, the "next higher list" would be list 2. This list would actually generate a lower voltage across the primary transformer windings 30-34 in response to an A.C. signal applied to the secondary transformer windings 40-44, and would thus lower the charging current.

If the current I is not found to be greater than $I_{MAX}$ at 212, the charging current I is compared to a minimum reference value $I_{MIN}$ at 216. If the current I is less than $I_{MIN}$, the next lower list is selected at 218. The "next lower list" is the list that generates a higher voltage across the primary transformer windings 30-34 in response to an A.C. signal applied to the secondary transformer windings 40-44, and would thus increase the charging current. For list 3 of Table 3, the "next lower list" would be list 4.

If the current I is not found to be either greater than $I_{MAX}$ at 212 or less than $I_{MIN}$ at 216, the current list is selected at 220. As with the program functioning as an inverter, the current list is either the last list selected or, for the first pass through the program, a default list selected in the initialization procedure at 140.

After the list for the desired charging current has been selected, the program proceeds to 230, where the number $N_{MAX}$ corresponding to the number of voltage values in the selected list is loaded. The voltage value index N is then set to 1 at 232 in order to initially designate the first voltage value.

The program then proceeds to 234, where the microprocessor 100 outputs to the decoder and timing circuits 90-94 the control bits corresponding to the current voltage value. As shown in Table 2, the microprocessor 100 would output the bits "10 01 01" for a current voltage value of 165. As with step 162, the current voltage value will remain until a predetermined delay implemented by steps 240-244 has expired. An internal counter in the microprocessor 100 is loaded with an appropriate delay time T at 240, and the value T is then checked at 242. If T is not found at 242 to be equal to 0, it is decremented at 244 and then rechecked at 242. The value T is repetitively decremented at a known, fixed rate until the delay time T has been decremented to 0, at which point the program proceeds to 250.

After the delay time T has been decremented to 0, the voltage value index N is incremented at 250 to select the next voltage value in the selected list. For example, for list 3 in Table 3, the next (i.e., N=2) voltage value would be 150. The program then checks at 252 to determine if the previously selected voltage value was the final value, thus indicating that all of the voltage values for one cycle of the A.C. voltage waveform have been output. The program then return to 142, as explained above.

The inventive inverter is thus capable of generating a waveform that closely resembles a sine wave having a regulated output despite variations in the magnitude of the D.C. voltage applied to the inverter or variations in the A.C. load. Furthermore, the inverter can generate a wide variety of output waveforms. Moreover, the inventive inverter can be easily adapted to generate D.C. power from A.C. power for battery charging purposes.

I claim:

1. A power inverter for converting a D.C. voltage applied between first and second D.C. terminals to an A.C. voltage having a predetermined frequency and amplitude generated between first and second A.C. terminals, said inverter comprising:

a plurality of transformers, each having a primary transformer winding coupled to a secondary transformer winding by a respective turns ratio, the secondary transformer windings for all of said transformers being connected in series with each other between said A.C. terminals such that the voltage across said A.C. terminals is proportional to the sum of the products of the turns ratio of each of said transformers and the voltage applied thereto;

switch means connected between said D.C. terminals and the said primary transformer winding for each of said transformers, the switch means for each of said transformer windings being controllable by a respective set of control signals between an off state in which said primary transformer winding is shorted, a positive state in which said primary transformer winding is connected between said D.C. terminals in one direction, and a negative state in which said primary transformer winding is connected between said D.C. terminals in the opposite direction, thereby causing the voltages across the secondary transformer windings to be either positive, zero or negative, said switch means including a switching bridge formed by first and second pairs of series-connected semiconductor switches, each pair of said switches being connected in parallel between said first and second D.C. terminals, with said primary transformer winding being connected between the junctions between the semiconductor switches in said pairs, and wherein said control signals applied to said switch means during said positive state close the semiconductor switch in said first pair that is connected to said first D.C. terminal, close the semiconductor switch in said second pair that is connected to said second D.C. terminal, and open the remaining semiconductor switches, thereby causing current to flow through said primary transformer winding in one direction, and wherein said control signals applied to said switch means during said negative state close the semiconductor switch in said first pair that is connected to said second D.C. terminal, close the semiconductor switch in said second pair that is connected to said first D.C. terminal, and open the remaining semiconductor switches, thereby causing current to flow through said primary transformer winding in the opposite direction; and control means connected to said switch means for generating said control signals and applying said control signals to said switch means, said control means generating $3^N$ combinations of said state control signals as a function of time, where N is the number of said primary transformer windings, said combinations of said control signals being generated to cause the A.C. signal generated across said A.C. terminals to approximate a predetermined waveform, said control means including decoder means for applying said control signals to each series-connected pair of said semiconductor switches, said decoder means generating control signals that cause both semiconductor switches in each pair to be off for a predetermined period each time said switch means are switched to a positive state or a negative state, thereby preventing both semiconductor switches in a pair to be simultaneously closed.

2. A power inverter for converting a D.C. voltage applied between first and second D.C. terminals to an A.C. voltage having a predetermined frequency and amplitude generated between first and second A.C. terminals, said inverter comprising:

a plurality of transformers, each of which includes a primary transformer winding coupled to a secondary transformer winding by a respective turns ratio, the secondary transformer windings for all of said transformers being connected in series between said A.C. terminals such that the voltage across said A.C. terminals is proportional to the sum of the products of the turns ratio of each of said transformers and the voltage applied thereto;

a switching bridge for each of said primary transformer windings, each of said switching bridges including first and second pairs of series-connected semiconductor switches, each pair of said switches being connected in parallel between said first and second D.C. terminals, with said primary transformer winding being connected between the junctions between the semiconductor switches in said pairs;

a control signal generator connected to each of said semiconductor switches, said control signal generator generating a first set of control signals during a first state, a second set of control signals during a second state, and a third set of control signals during a third state; said first set of control signals closing the semiconductor switch in said first pair that is connected to said first D.C. terminal, closing the semiconductor switch in said second pair that is connected to said second D.C. terminal, and opening the remaining semiconductor switches, thereby causing current to flow through said primary transformer winding in one direction during said first state; said second set of control signals closing the semiconductor switch in said first pair that is connected to said second D.C. terminal, closing the semiconductor switch in said second pair that is connected to said first D.C. terminal, and opening the remaining semiconductor switches, thereby causing current to flow through said primary transformer winding in the opposite direction in said second state; and said third set of control signals closing the semiconductor switch in said first and second pair that are connected to said first D.C. terminal and opening the remaining semiconductor switches, thereby shorting the respective primary transformer windings; said first, second, and third states for respective primary transformer windings being generated in a predetermined combination as a function of time so that an A.C. signal having a predetermined amplitude and waveform is generated between said A.C. terminals, said control signal generator including a microprocessor including a memory storing a lookup table having a plurality of sets of data, each set of data corresponding to a predetermined combination of control signal states for said primary transformer windings which either prevent current from flowing or cause current to flow through said primary transformer windings in a predetermined combination corresponding to a predetermined phase range of a sine wave, said microprocessor generating said control signals in a predetermined sequence corresponding to a sequence of said sets of data stored in said lookup table; and an output voltage regulator controlling the voltage of said A.C. signal, said regulator comprising an analog-to-digital converter having an analog input to which a signal indicative of the voltage of said A.C. signal is coupled, said analog-to-digital converter having a digital output on which a digital word indicative of the voltage of said A.C. signal is generated, said digital output being connected to an input port of said microprocessor, and wherein said lookup table contains a plurality of data tables, each of which contains said plurality of sets of data corresponding to a sine wave having a respective amplitude, the data table from which said microprocessor chooses said sets of data being determined as a function of the digital word output from the digital output of said analog-to-digital converter whereby the voltage of said A.C. signal is regulated to a relatively constant value.

3. A power inverter for converting a D.C. voltage applied between first and second D.C. terminals on an A.C. voltage having a predetermined frequency and amplitude generated between first and second A.C. terminals, said inverter comprising:

a plurality of transformers, each of which includes a primary transformer winding coupled to a secondary transformer winding by a respective turns ratio, the secondary transformer windings for all of said transformers being connected in series between said A.C. terminals such that the voltage across said A.C. terminals is proportional to the sum of the products of the turns ratio of each of said transformers and the voltage applied thereto;

a switching bridge for each of said primary transformer windings, each of said switching bridges including first and second pairs of series-connected semiconductor switches, each pair of said switches being connected in parallel between said first and second D.C. terminals, with said primary transformer winding being connected between the junctions between the semiconductor switches in said pairs;

a control signal generator connected to each of said semiconductor switches, said control signal generator generating a first set of control signals during a first state, a second set of control signals during a second state, and a third set of control signals during a third state; said first set of control signals closing the semiconductor switch in said first paper that is connected to said first D.C. terminal, closing the semiconductor switch in said second pair that is connected to said second D.C. terminal, and opening the remaining semiconductor switches, thereby causing current to flow through said primary transformer winding in one direction during said first state; said second set of control signals closing the semiconductor switch in said first pair that is connected to said second D.C. terminal, closing the semiconductor switch in said second pair that is connected to said first D.C. terminal, and opening the remaining semiconductor switches, thereby causing current to flow through said primary transformer winding in the opposite direction in said second state; and said third set of control signals closing the semiconductor switch in said first and second pair that are connected to said first D.C. terminal and opening the remaining semiconductor switches, thereby shorting the respective primary transformer windings; said first, second and third states for respective primary transformer windings being generated in a predetermined combination as a function of time so that an A.C. signal having a predetermined amplitude and waveform is generated between said A.C. terminals, said control signal generator including a microprocessor including a memory storing a lookup table having a plurality of sets of data, each set of data corresponding to a predetermined combination of control signal states for said primary transformer windings which either prevent current from flowing or cause current to flow through said primary transformer windings in a predetermined combination corresponding to a predetermined phase range of a sine wave, said microprocessor generating said control signals in a predetermined sequence corresponding to a sequence of said sets of data stored in said lookup table; and a battery charger circuit causing said inverter to function as a battery charger by converting an A.C. voltage applied between said first and second A.C. terminals to a D.C. voltage generated between first and second D.C. terminals, comprising a battery charger control circuit operatively connected to said A.C. terminals and to said switching bridge, said battery charger control circuit sampling said A.C. voltage to determine the frequency and phase of said A.C. voltage, said battery charger control circuit generating said first set of control signals when said A.C. voltage has one polarity and said second set of control signals when said A.C. voltage has the opposite polarity.

* * * * *